United States Patent [19]
Siegenthaler

[11] Patent Number: 6,059,910
[45] Date of Patent: May 9, 2000

[54] METHOD AND DEVICE FOR PRODUCING A TOROIDAL CARCASS FOR A ROAD VEHICLE TIRE

[75] Inventor: Karl J. Siegenthaler, Pratteln, Switzerland

[73] Assignee: Bridgestone Corporation, Tokyo, Japan

[21] Appl. No.: 09/111,514

[22] Filed: Jul. 8, 1998

[30] Foreign Application Priority Data

Jul. 8, 1997 [IT] Italy ................................. T097A0602
Oct. 17, 1997 [IT] Italy ................................. T097A0915

[51] Int. Cl.[7] .................................................. B29D 30/10
[52] U.S. Cl. ........................... 156/117; 156/397; 156/417
[58] Field of Search .................................... 156/117, 133, 156/134, 123, 130.7, 397, 417, 418, 419, 420; 152/548, 558, 562, 563

[56] References Cited

U.S. PATENT DOCUMENTS

| | | |
|---|---|---|
| 1,328,006 | 1/1920 | McLeod .................................. 156/117 |
| 3,847,706 | 11/1974 | Yabe ....................................... 156/417 |
| 5,308,432 | 5/1994 | Siegenthaler ............................ 156/117 |
| 5,460,685 | 10/1995 | Siegenthaler ............................ 156/417 |
| 5,798,018 | 8/1998 | Siegenthaler ............................ 156/397 |
| 5,861,073 | 1/1999 | Gazuit et al. ........................... 156/117 |

FOREIGN PATENT DOCUMENTS

| | | |
|---|---|---|
| 390762 | 6/1990 | Austria . |
| 549868 | 7/1993 | European Pat. Off. . |
| 661150 | 7/1995 | European Pat. Off. . |
| 780219 | 6/1997 | European Pat. Off. . |

*Primary Examiner*—Geoffrey L. Knable
*Attorney, Agent, or Firm*—John M. Vasuta; Michael Sand

[57] ABSTRACT

A toroidal carcass is formed using a toroidal frame defined by two annular beads and by a removable outer ring divided into angular sectors; a winding device for feeding a spool, housing a cord, about and through the frame from a first to a last of the angular sectors; and an actuating device, which, before the cord is wound completely, moves the first angular sector into an operating position defining, with the last angular sector, an opening for the passage of the spool.

26 Claims, 10 Drawing Sheets

METHOD AND DEVICE FOR PRODUCING A TOROIDAL CARCASS FOR A ROAD VEHICLE TIRE

BACKGROUND OF THE INVENTION

The present invention relates to a method of producing a toroidal carcass for a road vehicle tire.

More specifically the present invention relates to a straightforward, low-cost method of producing a toroidal carcass for radial tires; the carcass being a woven carcass of the type in which two annular beads are connected by a reticulated structure comprising a number of elongated reinforcing elements, which are wound about the beads to connect the beads to each other, and which extend in substantially radial planes with respect to the beads.

A carcass of the above type is known to be produced using a forming device comprising a removable annular element, which is located radially outwards of the two beads, and is centered axially with respect to the beads to define, with the beads, a toroidal frame having two annular openings, each located between the annular element and a respective bead. The known forming device also comprises a frame supporting and activating unit for rotating the frame about its axis; and a winding device, which, as the frame rotates, winds a cord about the frame along a spiral path, each turn of which comprises a first half-turn entirely outside the frame, and a second half-turn extending through the two openings in the frame and connected to the other half-turn outside the two beads.

The cord is normally wound along said spiral path about the frame by means of a device for feeding along the spiral path a cartridge carrying a supply of cord. Completion of the carcass using such cartridges obviously poses serious difficulties in that, as the distance between the start and end of the spiral path gets smaller, the opening between the start and end of the path eventually becomes too small to allow passage of the cartridge, which must therefore be replaced with increasingly narrower cartridges to complete the woven carcass.

In addition to the downtime involved, such cartridge changes also result in the formation of dangerous knots in the cord.

SUMMARY OF THE INVENTION

It is an object of the present invention to provide a straightforward, fast method of producing a woven carcass of the above type, and which provides for eliminating the aforementioned drawback.

According to the present invention, there is provided a method of producing a toroidal carcass for a road vehicle tire; the carcass being a woven carcass of the type comprising two annular beads, and a reticulated structure defined by at least one cord wound about the beads and connecting the beads to each other; and the method comprising the steps of:

positioning said two beads coaxially with and at a given distance from each other;

positioning a removable auxiliary annular element radially outwards of the two beads and centered axially with respect to the two beads, so as to define, with the two beads, a toroidal frame having an axis and two annular openings coaxial with said axis; and feeding a spool, housing a given length of said cord, about the frame by means of a winding device to wind the cord about the frame along a spiral path comprising a number of turns, each extending about the beads and the annular element and through said openings;

characterized in that said auxiliary annular element comprises at least one movable sector along which an initial portion of said path extends; the method comprising the further step, prior to winding said cord completely along the whole of said path, of moving said movable sector from a first operating position, in which the movable sector is aligned with a remaining portion of said auxiliary annular element, to a second operating position, in which the movable sector at least overlaps said remaining portion of said auxiliary annular element.

The present invention also relates to a device for producing a woven carcass.

According to the present invention there is provided a device for producing a toroidal carcass for a road vehicle tire; the carcass being a woven carcass of the type comprising two annular beads, and a reticulated structure defined by at least one cord wound about the beads and connecting the beads to each other; the device comprising a removable auxiliary annular element located radially outwards of the two beads and centered axially with respect to the two beads, so as to define, with the two beads, a toroidal frame having a first axis and two annular openings coaxial with said first axis; and a winding device comprising a spool housing a given length of said cord, and a movable unit for feeding said spool about said frame to wind the cord about the frame along a spiral path; said spiral path comprising a number of turns, each extending about the beads and the annular element and through said openings; characterized in that said auxiliary annular element comprises at least one movable sector along which an initial portion of said path extends; actuating means being provided to move said movable sector between a first operating position, in which the movable sector is aligned with a remaining portion of said auxiliary annular element, and a second operating position, in which the movable sector at least overlaps said remaining portion of said auxiliary annular element.

BRIEF DESCRIPTION OF THE DRAWINGS

The present invention will now be described by way of example with reference to the accompanying drawings, in which:

FIG. 2 shows a section along line II—II in FIG. 1a;

FIG. 3 shows an exploded view in perspective of a detail in FIG. 1a;

DETAILED DESCRIPTION OF THE INVENTION

Figure 2:
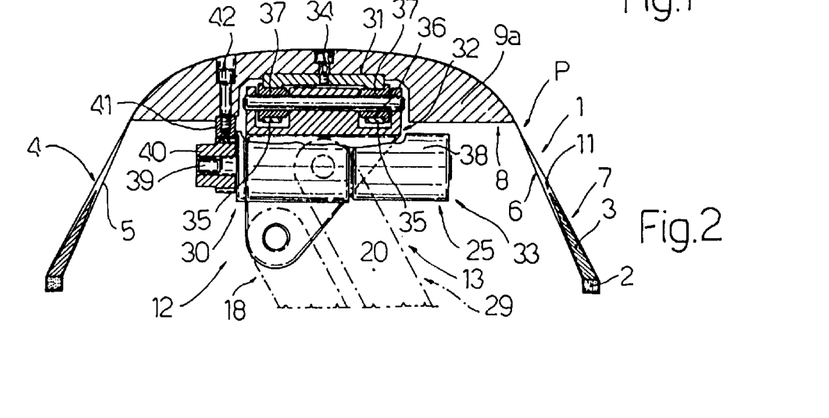
Figure 3:
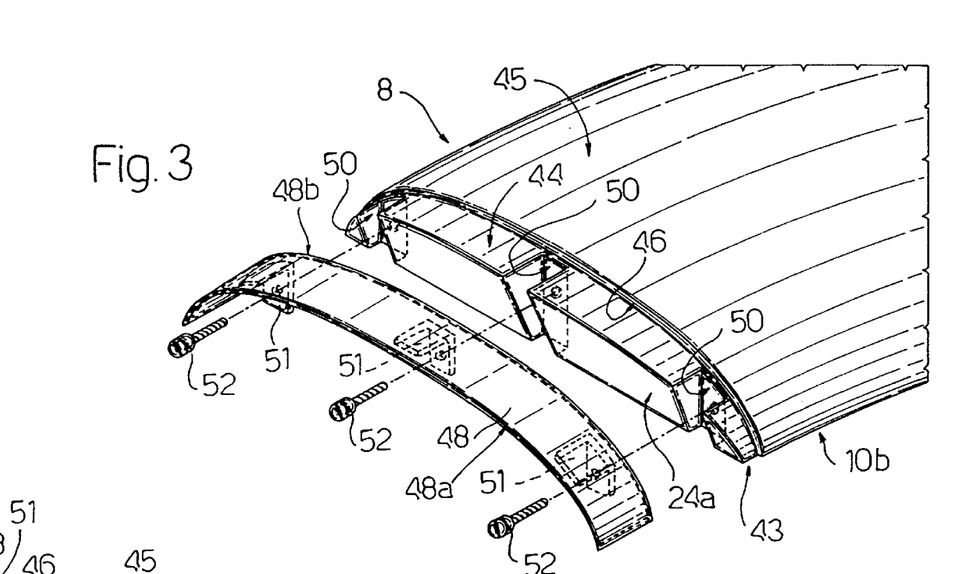

With reference to FIG. 2, numeral 1 indicates as a whole a toroidal carcass for a road vehicle tire.

Carcass 1 is a woven carcass comprising two annular beads 2 with respective bead fillers 3; and a toroidal reticulated structure 4 connecting the two beads 2 and defined by at least one continuous cord 5 wound in a spiral path P about beads 2 to form a succession of laterally contacting turns 6. Each turn 6 defines an elongated reinforcing element connecting, and extending in a substantially radial plane with respect to, beads 2.

Figure 1:
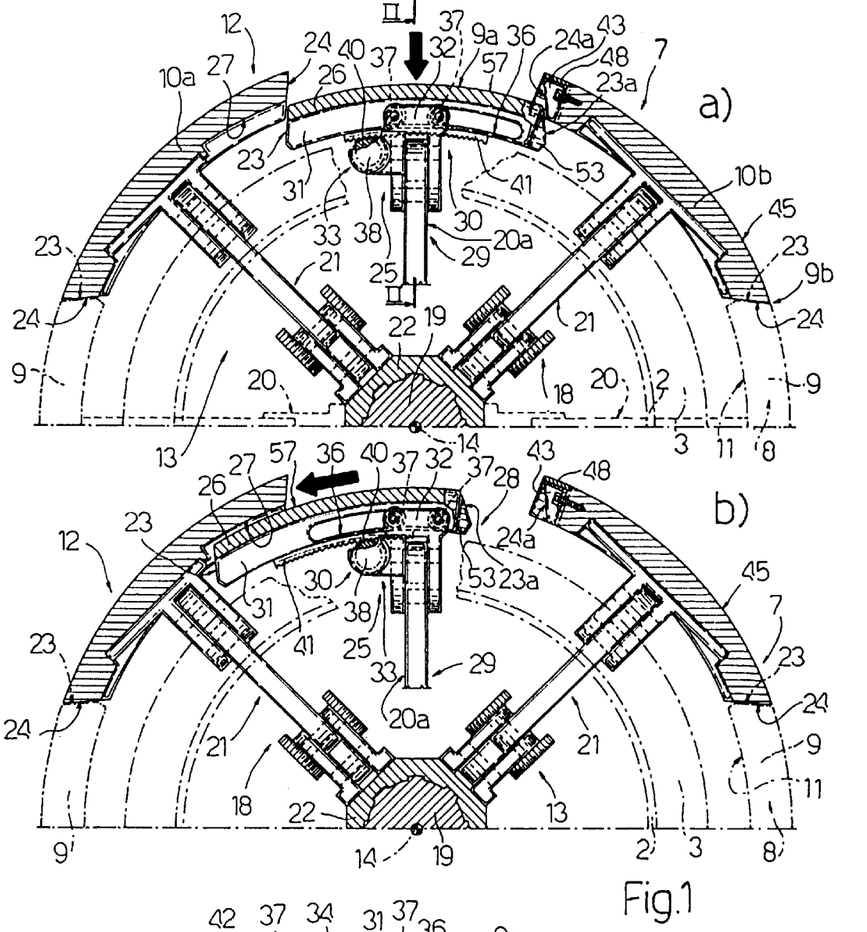
FIGS. 1a and 1b show two sections of a preferred embodiment of the device according to the invention in two different operating conditions and with parts removed for clarity.

Carcass 1 is formed on a supporting frame 7, which comprises an inner portion defined by beads 2, and a removable auxiliary outer portion defined by a ring 8 in turn defined by two numbers of curved angular sectors 9 and 10 (FIG. 1) arranged alternately and connected releasably to one another. Ring 8 is located radially outwards of, and centered axially with respect to, beads 2 to define, with beads 2, two annular openings 11.

For the sake of simplicity, and with reference to FIG. 1, 9a indicates a first sector about which the first turns of carcass 1 are wound; 10a indicates a second sector next to the first and about which the winding continues when the winding about first sector 9a is completed; 10b indicates a last sector next to sector 9a and on the opposite side of sector 9a to sector 10a; and 9b indicates the rest of ring 8 if sector 9a is removed.

Figure 8:
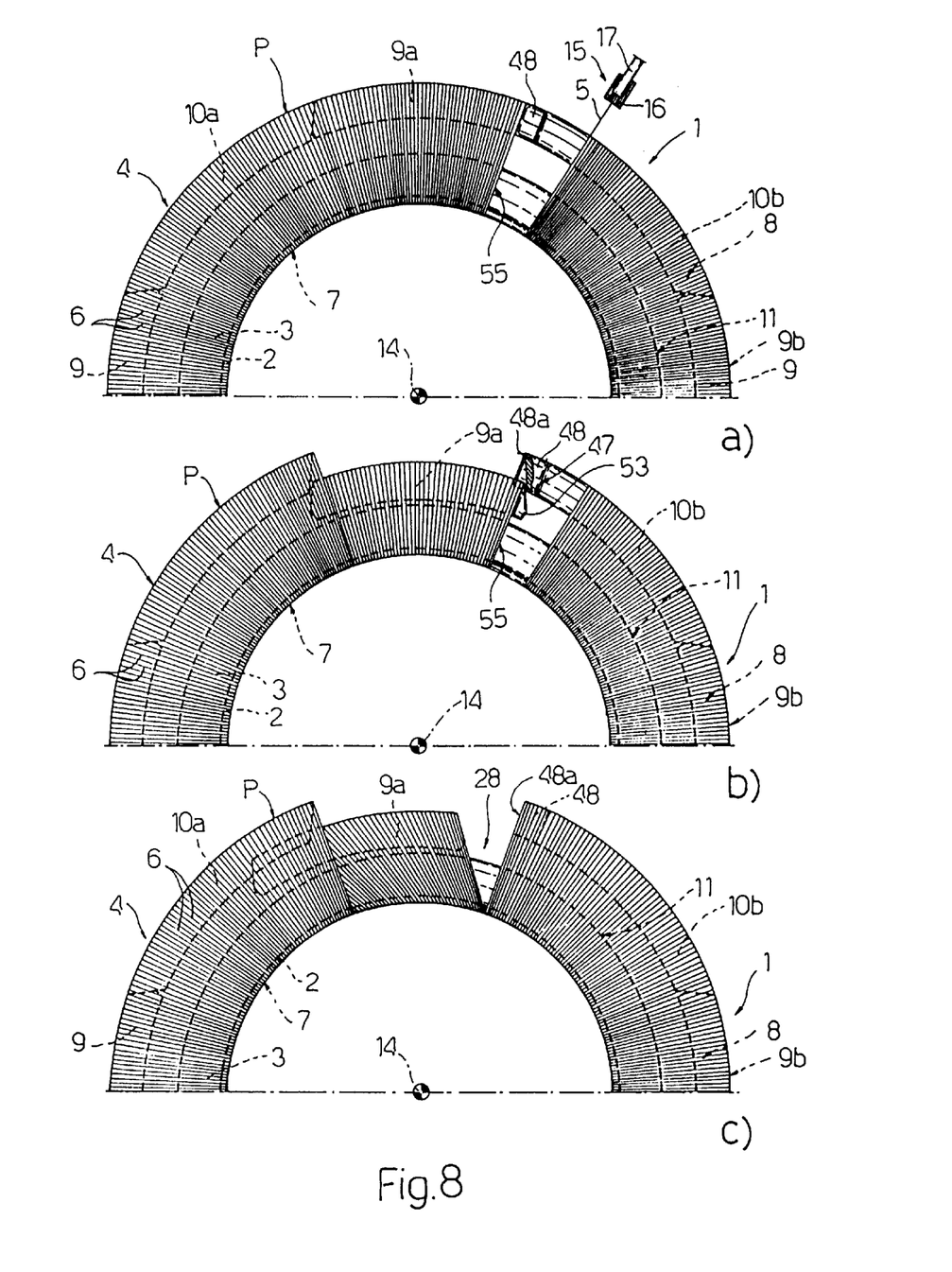
FIG. 8 shows the FIG. 1 device forming a woven carcass.

Ring 8 forms part of a forming device 12 (FIG. 1) for forming carcass if and comprising a supporting and activating unit 13 for supporting frame 7 and rotating it at controlled speed about a respective axis 14,; and a winding device 15 (FIG. 8a) for winding cord 5 about frame 7 as frame 7 rotates about axis 14.

With reference to FIG. 8a, winding device 15 in turn comprises a spool 16 carrying a given length of cord 5; and a movable unit 17 for moving spool 16 about frame 7.

As shown in FIG. 1, supporting and activating unit 13—a detailed description of which is to be found in EU-A-0661150—comprises a known supporting device 18 for supporting ring 8, and a known device (not shown) for supporting beads 2. Supporting device 18 in turn comprises a central shaft 19 coaxial with axis 14; and two numbers of supporting elements 20 and 21 extending substantially radially from a sleeve 22 fitted to shaft 19 to connect sectors 9 and 10 in movable manner to sleeve 22. More specifically, supporting elements 20 and 21 are defined by respective articulated parallelograms located in respective radial planes with respect to axis 14, and for moving respective sectors 9 and 10 radially between a normal extracted position, in which sectors 9 and 10 are contiguous and define ring 8, and a withdrawn position (not shown), in which sectors 9 and 10 are located close to shaft 19 to form, about shaft 19, two rings aligned with each other along axis 14 and having an outside diameter smaller than the inside diameter of beads 2.

More specifically, sectors 9 and 10 are moved into the withdrawn position (not shown) in two successive stages: a first in which sectors 9 are withdrawn, and a second in which sectors 10 are withdrawn. For which purpose, each sector 9 is defined at opposite ends by two surfaces 23, which are positioned contacting respective end surfaces 24 of the adjacent sectors 10 and, as opposed to extending radially, are substantially parallel to each other and to the radial traveling direction of the respective supporting element 20.

Such a non-radial arrangement of surfaces 23 and 24 not only enables sectors 9 to be extracted from ring 8 into the withdrawn position (not shown), but also prevents the turn 6 at the plane of contact 23–24 between each pair of adjacent sectors 9 and 10 from getting caught between sectors 9 and 10.

Forming device 12 also comprises an actuating device 25, which, as described in detail later on, provides, at one of the steps in the formation of carcass 11 for moving sector 9a between a first operating position (FIG. 8a) coincident with the normal extracted positions and a second operating position (FIGS. 1b and 8c), in which sector 9a is partly withdrawn and angularly overlaps sector 10a. More specifically, in the second operating position, a portion 26 of sector 9a engages a longitudinal groove 27 formed on the inner surface of sector 10a, and sector 9a defines with sector 10b an opening 28 communicating with openings 11 and defining a theoretical extension of windows 11 by which, as explained clearly later on, to permit the passage of spool 16 to wind the last turns 6 of carcass 1.

Actuating device 25 comprises a radial actuating unit 29, which is defined by the supporting element 20—hereinafter indicated 20a—relative to sector 9a, and is movable independently of the other supporting elements 20 to move sector 9a radially from the first operating position to an intermediate withdrawn position (FIGS. 1a and 8b); and an angular actuating unit 30 for moving sector 9a, with respect to supporting element 20a, between the intermediate withdrawn position and the second operating position.

Unit 30 is interposed between sector 9a and supporting element 20a, and comprises a slide defined by a rib 31 integral with sector 9a; a carriage 32 integral with supporting element 20a and fitted in sliding manner to rib 31 as described later on; and an actuating device 33 for moving rib 31, with respect to carriage 32, between a first limit position, in which sector 9a is in the intermediate withdrawn position, and a second limit position, in which sector 9a is in the second operating position.

As shown in FIG. 2, rib 31 extends circumferentially along sector 9a, has a U-shaped section, and is fitted by screws 34 to the inner surface of sector 9a. Rib 31 comprises two inward-facing arms 35, each of which has a respective curved slot 36 parallel to slot 36 of the other arm 35 and engaged by a respective pair of idle wheels 37 carried by carriage 32, which is formed in one piece with a connecting rod of supporting element 20a.

Actuating device 33 (FIG. 2) comprises a motor reducer 38 supported by supporting element 20a and having an output shaft 39 fitted with a pinion 40 meshing with a curved rack 41, which is fitted by screws 42 to sector 9a and extends alongside and parallel to rib 31.

With reference to FIGS. 3–7, sector 10b comprises an end appendix 43, which adjoins sector 9a, is defined axially by a respective surface 24—hereinafter indicated 24a—for connection to sector 9a, and is defined radially by an outer surface 44, which is lower than the outer radial surface 45 of sector 10b, and is connected to surface 45 by a shoulder 46 lying in a substantially radial plane 47 (FIGS. 4 and 5) with respect to axis 14. As appendix 43 is located between substantially radial plane 47 and surface 24*a*—which is substantially parallel to the plane of supporting element 20*a*—surface 44, when viewed from above (FIG. 7), tapers at the ends, and appendix 43, in section crosswise to axis 14 (FIG. 5), is substantially trapezoidal in shape and tapers inwards of ring 8.

End appendix 43 is covered externally by a curved plate 48, which, when viewed from above (FIG. 7), is substantially rectangular and of a width substantially equal to the maximum central width of surface 44, and is defined by two edges 48*a* and 48*b* substantially parallel to each other and lying in respective radial planes with respect to axis 14. Edge 48*b* is positioned contacting shoulder 46, while edge 48*a* is located outwards and is inclined like surface 24*a*. Plate 48 is of a thickness equal to the difference in the levels of surfaces 44 and 45, and is defined externally by an outer surface defining an extension of surface 45. Given its shape when viewed from above, the opposite end portions of plate 48 project beyond surface 24*a*, and define, with surface 24*a*, a chamber 49 (FIG. 4), the section of which crosswise to axis 14 varies along axis 14 and is generally triangular.

Figure 7:
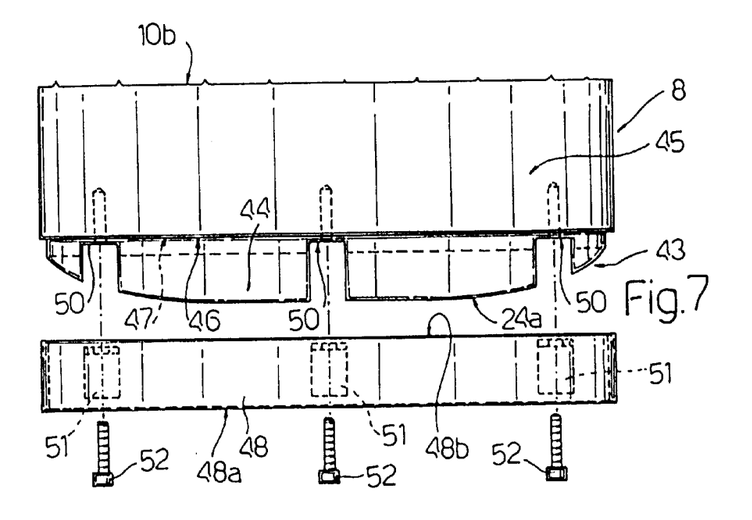
FIG. 7 shows a top plan view of the FIG. 3 detail.

To fix plate 48 to appendix 43 of sector 10*b*, surface 24*a* has three radial grooves 50 with respective bottom surfaces lying in plane 47, while plate 48 has three L-shaped inner brackets 51, each of which engages a respective groove 50 and is fixed contacting the bottom of groove 50 by a respective screw 52.

Figure 4:
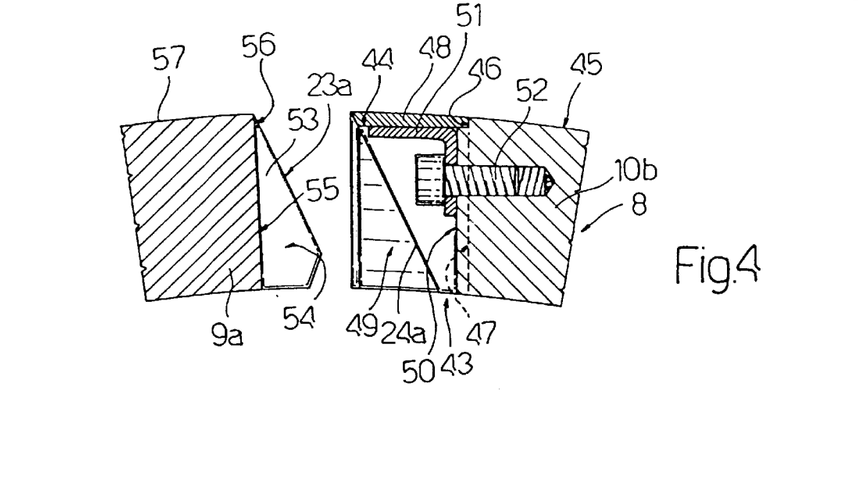
FIG. 4 shows a larger-scale exploded section of a detail in FIG. 3.
Figure 5:
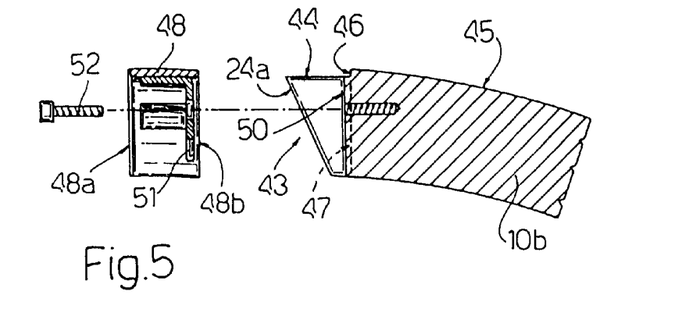
FIG. 5 shows a section of the FIG. 3 detail.
Figure 6:
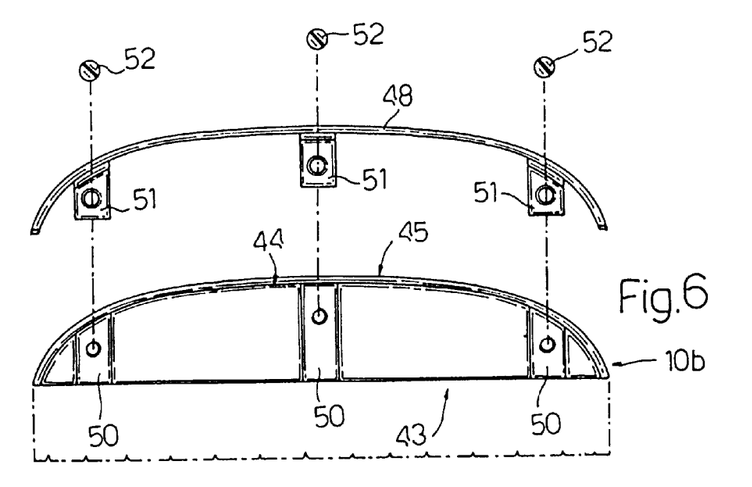
FIG. 6 shows a front view of the FIG. 3 detail.

As shown more clearly in FIG. 4, on the side facing sector 10*b*, sector 9*a* comprises an appendix 53 of substantially the same shape as chamber 49, and which fits inside chamber 49 when sector 9*a* is in the first operating position. Appendix 53 has a sunken outer radial surface 54 of the same shape as the inner surface of plate 48 left free by surface 44, and is located between a surface 23—indicated 23*a*—parallel to surface 24*a*, and a radial plane 55 containing a shoulder 56 connecting surface 54 to the outer radial surface 57 of sector 9*a*.

Plate 48 provides for covering appendixes 43 and 53 when sector 9*a* is in the extracted operating position aligned with the other sectors 9 and 10 to form ring 8, and for supporting the last turns 6 of cord 5 (FIG. 8*c*) and so ensuring the last turns 6 are the same length as all the other turns 6, when sector 9*a* is withdrawn from the first operating position.

Figure 9:
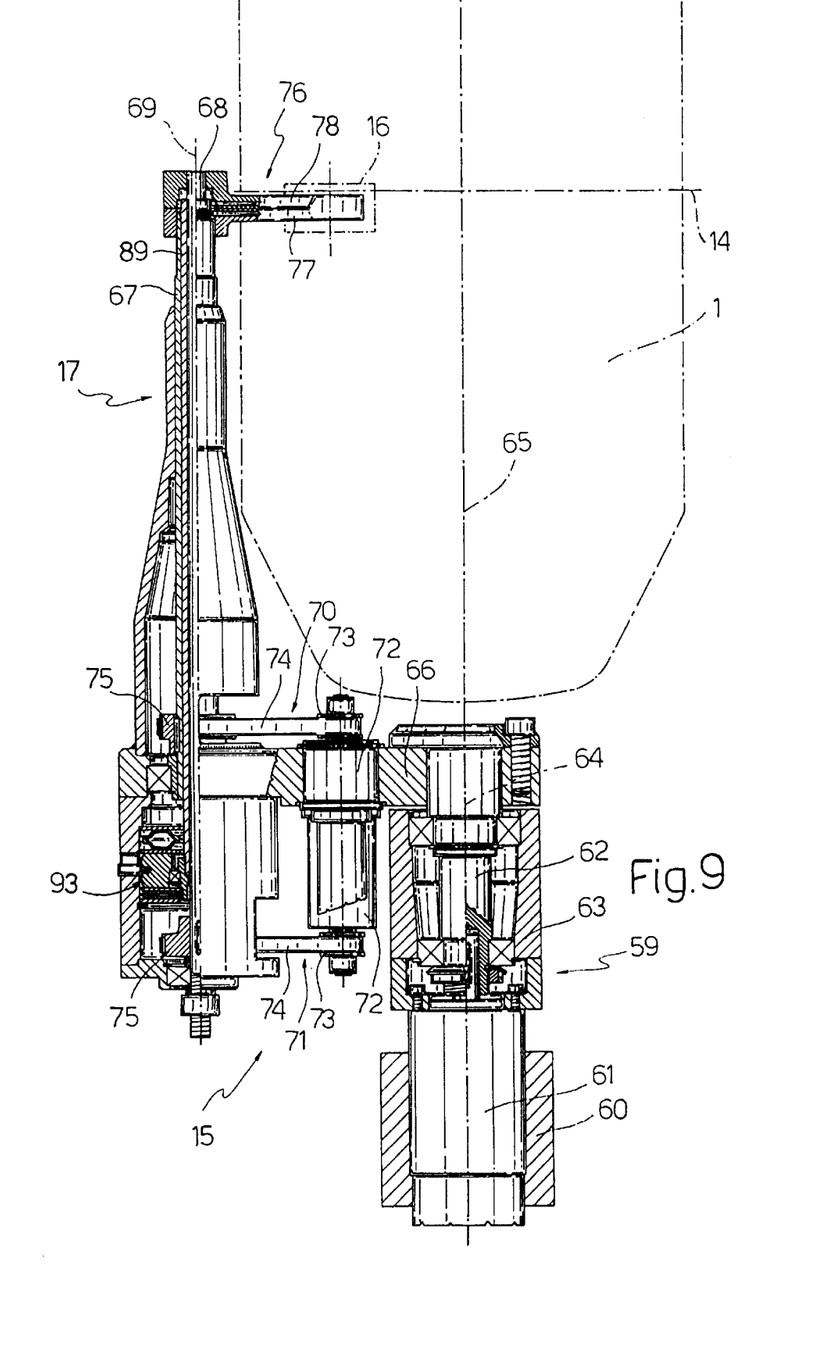
FIG. 9 shows a partly sectioned side view to a detail of FIG. 8.

As shown in FIG. 9, winding device 15 comprises, further to movable unit 17, a fixed unit 59 which supports movable unit 17 and comprises a supporting bracket 60 supporting a step motor 61 for powering movable unit 17; and motor 61 comprises an output shaft 62 extending inside an elongated casing 63 in a direction defined by an axis 64 lying in a mid plane 65 of frame 7 perpendicular to axis 12.

Movable unit 17 comprises an arm 66, which is fitted to shaft 62, extends in a plane perpendicular to axis 64, and is oscillated in said plane, by motor 61, between a first maximum-swing position (FIG. 2), and a second maximum-swing position (not shown) symmetrical with the first with respect to mid plane 65 and defining with the first position an angle of less than 225°.

Movable unit 17 also comprises a first shaft 67, and a second shaft 68 smaller in diameter and fitted inside the first, and both of which are fitted in rotary manner to arm 66, and extend from arm 66 coaxially with an axis 69 parallel to axis 64.

The first and second shafts 67, 68 are connected to respective actuating devices 70, 71 fitted to arm 66 and for oscillating the first and second shafts 67, 68 in opposite directions. Each actuating device 70, 71 comprises a step motor 72 fitted to arm 66; a drive pulley 73 fitted to the output shaft of motor 72; and a drive belt 74 connecting drive pulley 73 to a driven pulley 75 fitted to respective shaft 67, 68.

Movable unit 17 also comprises a winding head 76 in turn comprising a first and second gripping arm 77, 78 fitted, the second over the first, to the free ends of first and second shafts 67, 68 respectively.

Figures 12, 13, 14:
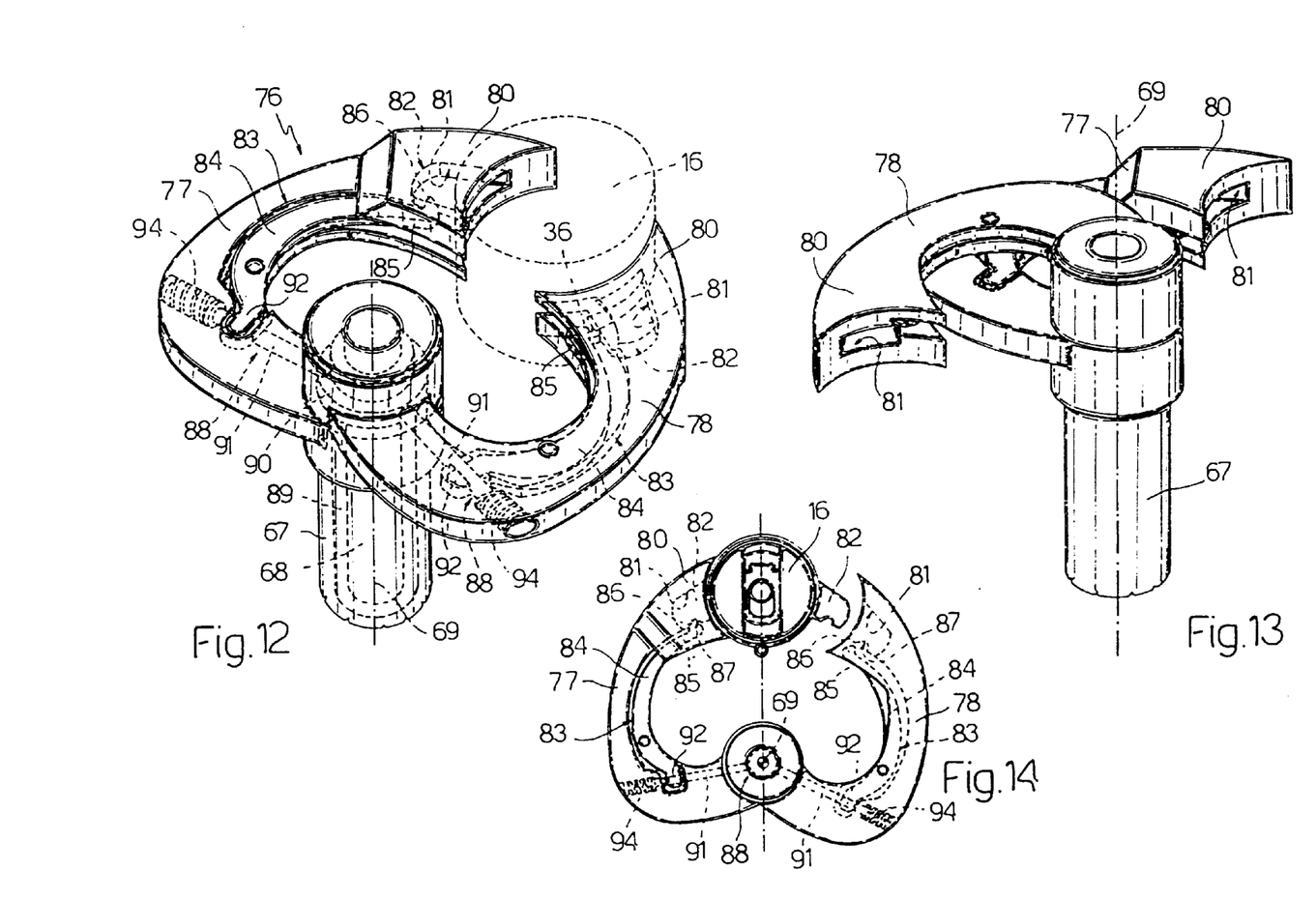
FIG. 12 shows an enlarged view in perspective of a FIG. 9 detail in a first operating condition.
FIG. 13 shows a view in perspective of the FIG. 12 detail in a second operating condition.
FIG. 14 shows a smaller-scale top plan view of the FIG. 12 detail in a third operating condition.

With reference to FIGS. 12–14, the first and second gripping arms 77, 78 are substantially U-shaped, each comprise, at a respective end portion 80, a front recess 81 for receiving a respective lateral extension 82 of spool 16, and are oscillated, by the oscillation of respective shafts 67, 68 and in opposite directions about axis 69, between a closed position shown in FIG. 12, and an open position shown in FIG. 13.

Each gripping arm 77, 78 also comprises a retaining device 83 (FIGS. 12 and 14) in turn comprising a rocker arm 84 pivoting on respective gripping arm 77, 78 and having a retaining tooth 86 on a respective first end 85. Tooth 86 is normally set to a forward position engaging a seat 87 formed in extension 82, when respective recess 81 is engaged by respective extension 82 of spool 16.

Rocker arms 84 are connected to a release device 88 (FIGS. 12 and 14) which acts alternately on one and the other of rocker arms 84 to extract respective tooth 86 from seat 87 and so disconnect respective gripping arm 77, 78 from spool 16. Release device 88 comprises a third shaft 89, which is fitted to arm 66, is located between first and second shafts 67, 68, and comprises on its free end a beveled-edged annular cam 90. Release device 88 also comprises a pair of tappet elements 91, each of which is pushed against third shaft 89 by a spring 94 and is interposed between third shaft 89 and a second end 92 of a respective rocker arm 84; and an electromagnetic actuating device 93 for moving third shaft 89 axially between a lowered position in which cam 90 is connected to tappet element 91 of first gripping arm 77, and a raised position in which cam 90 is connected to tappet element 91 of second gripping arm 78. Cam 90 provides for moving each tappet element 91 from a withdrawn position in which tappet element 91 contacts the lateral wall of third shaft 89 and maintains rocker arm 84 in a first position in which tooth 86 engages seat 87, and a forward position in which tappet element 91 is connected to cam 90 to set rocker arm 84 to a second position in which tooth 86 is detached from seat 87.

Spool 16 (shown schematically by the dot-and-dash line in FIG. 10 and in detail in FIGS. 15–17) forms part of winding head 76, contains a given length of cord 5 and is connectable to gripping arms 77, 78.

Figure 15:
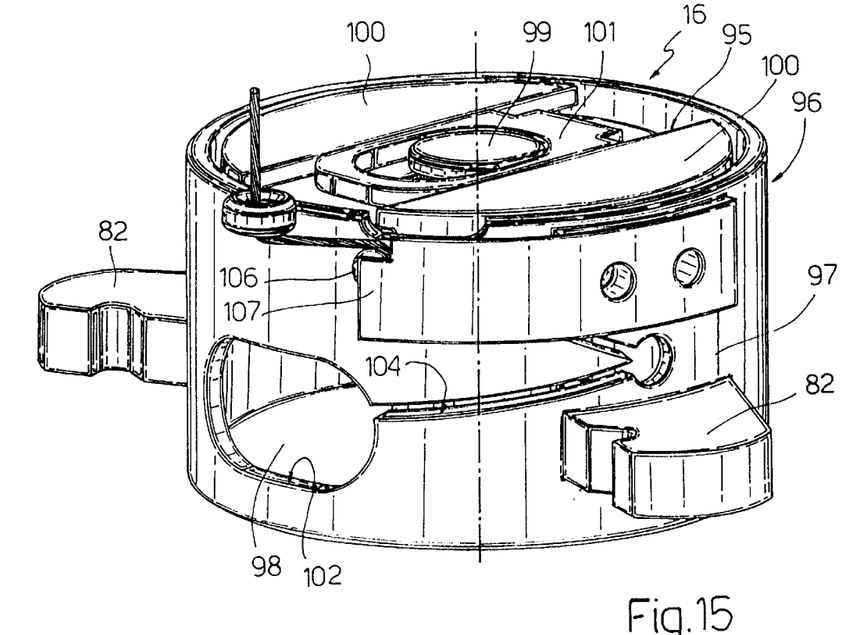
FIG. 15 shows a view in perspective of a further detail of the FIG. 9 device.
Figure 16:
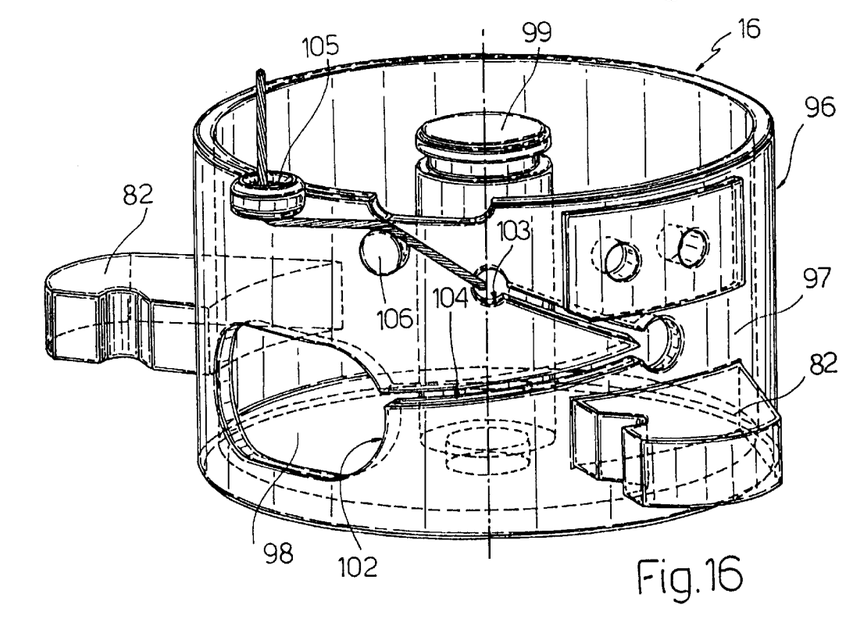
FIG. 16 shows the FIG. 15 detail with parts removed for clarity.
Figure 17:
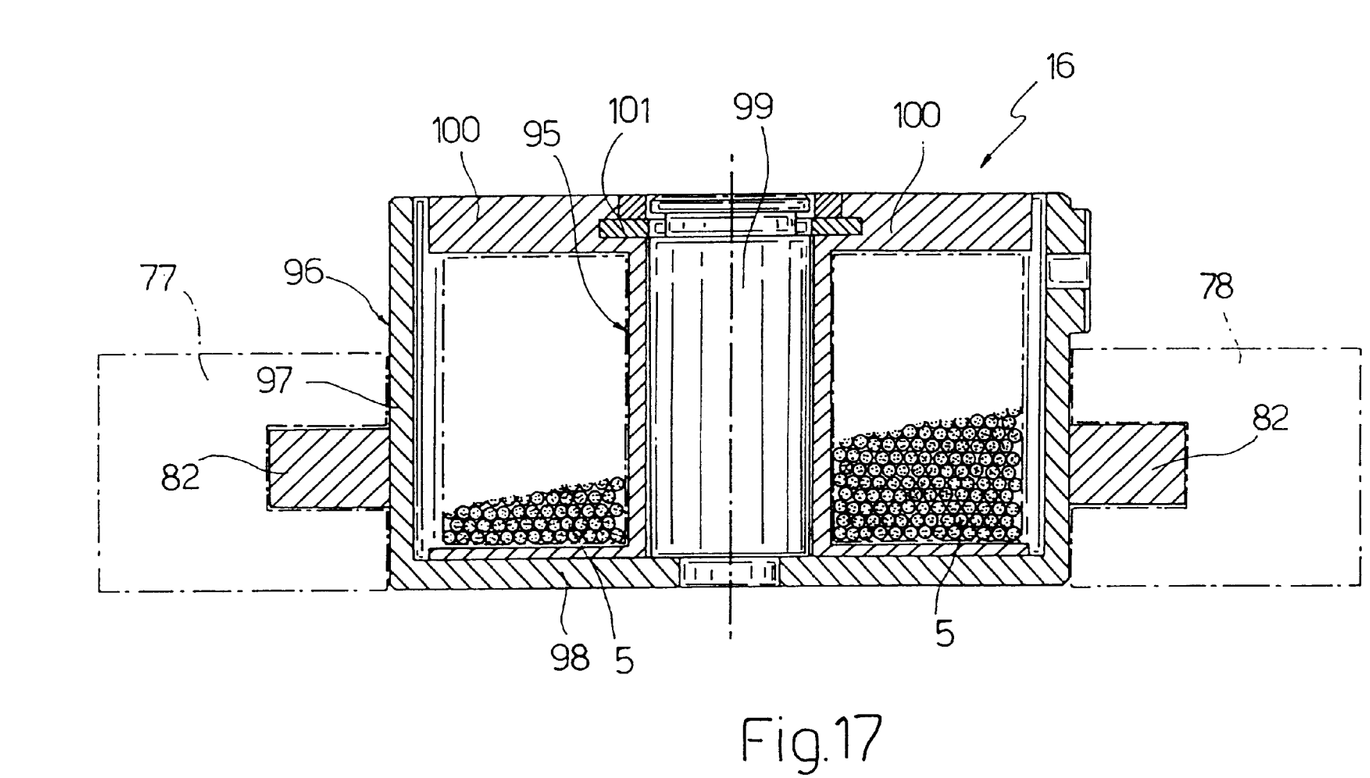
FIG. 17 shows a smaller-scale cross section of the FIG. 16 detail.

With reference to FIGS. 15–17, spool 16 comprises a cartridge 95 about which cord 5 is wound, and a substantially cup-shaped body 96 housing cartridge 95; cup-shaped body 96 comprises a cylindrical lateral wall 97 from which extensions 82 project, a bottom wall 98, and a central pin 99 extending from bottom wall 98 and idly supporting cartridge 95; and cartridge 95 comprises two half-disk-shaped elements 100 closing cup-shaped body 96 to retain cord 5, and a movable element 101 for fitting cartridge 95 itself axially to central pin 99.

Lateral wall 97 of cup-shaped body 96 comprises an opening 102 through which to initially extract cord 5 from cartridge 95; a hole 103 smaller than opening 102 and through which the cord is extracted during operation of device 11; and a V-shaped slot 104 connecting opening 102 to hole 103, and along which the initially extracted cord 5 is guided and threaded through hole 103.

Cup-shaped body 96 also comprises an annular element 105, which is fitted to lateral wall 97, has an axis parallel to the axis of spool 16, and provides for directing parallel to its own axis the cord 5 received from hole 103 via a pulley 106. A plate element 107 covering hole 103 provides for retaining cord 5 on pulley 106.

Figure 18:
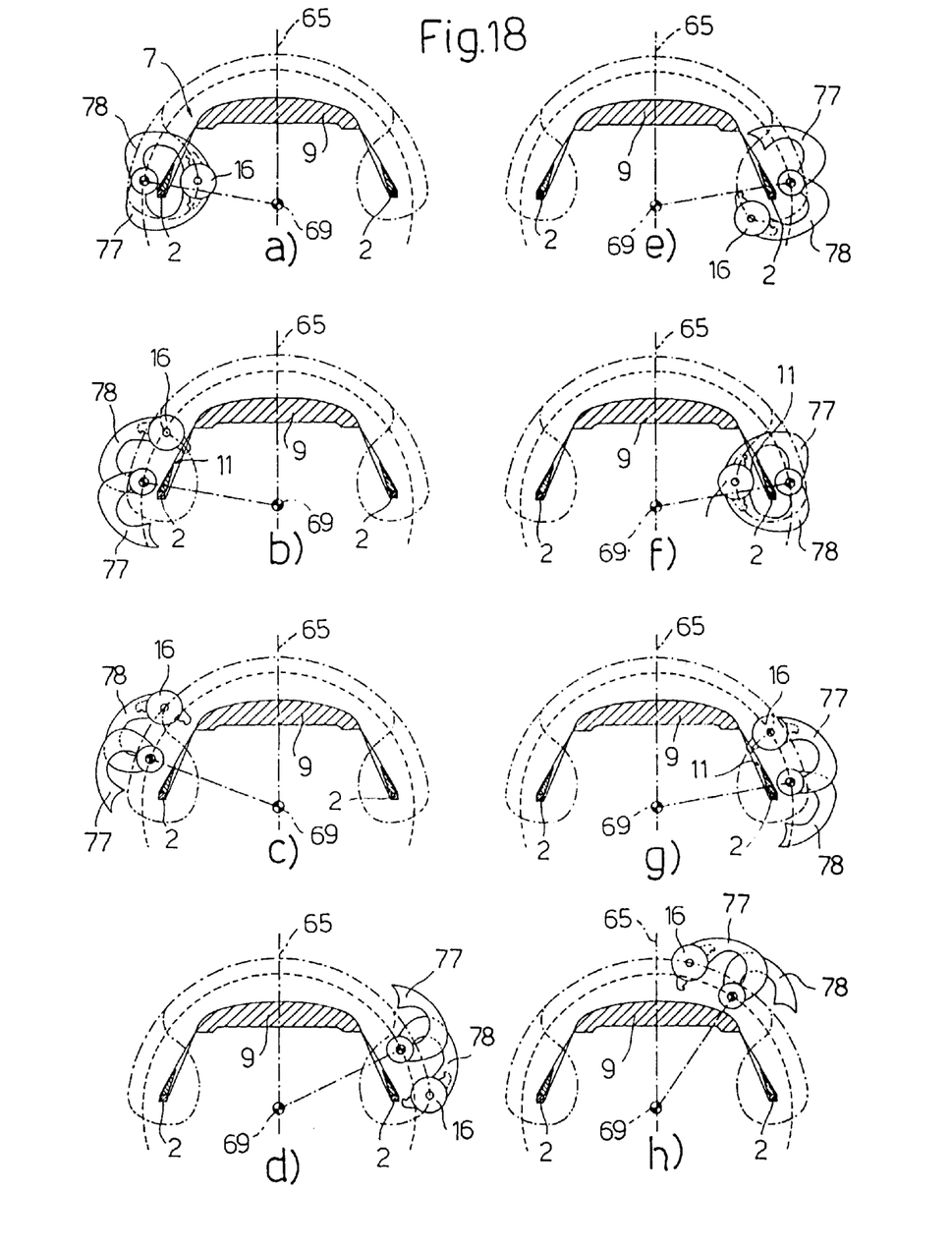
FIG. 18 shows, schematically, various operating positions of the device according to the present invention.

In actual use, and with reference to FIG. 8, once the two beads 2 have been fitted to supporting device 18 a given distance apart and coaxially with each other and axis 14, and once ring 8 has been expanded into an axially intermediate position between beads 2 and radially outwards of beads 2 to define the two openings 11 and frame 7, one end of cord 5 extracted through opening 102 is knotted manually to one of the two beads 2, and spool 16 is fed along spiral path P from plane 55 of sector 9a to plate 48 of sector 10b. To this end, device 15 is activated and repeatedly performs a winding cycle—described below with reference to FIGS. 18a to 18h—to form one turn 6 of carcass 1 at each cycle.

To begin with (FIG. 18a), arm 66 is set to a first of the two maximum-swing positions, and gripping arms 77 and 78 are closed about a first of the two beads 2 and both connected to spool 16. More specifically, one of the two gripping arms 77 and 78—arm 78 in FIG. 18a—is positioned through respective opening 11, and the other of the two gripping arms 77 and 78—arm 77 in FIG. 10a—is positioned outside frame 7.

Figure 10:
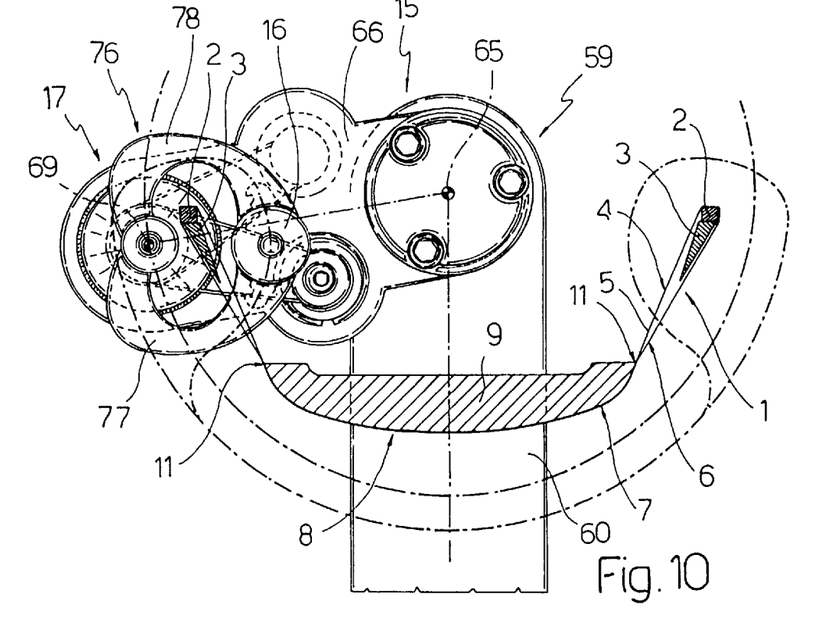
FIG. 10 shows a larger-scale top plan view of the detail of FIGS. 1 and 9.
Figure 11:
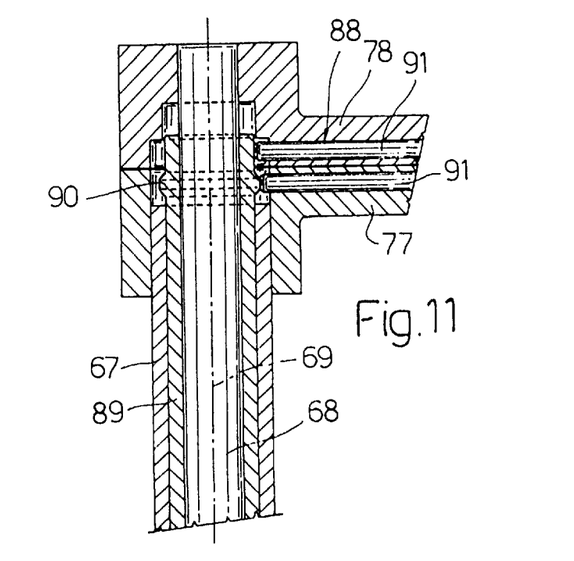
FIG. 11 shows a larger-scale view of a detail in FIG. 9.

Release device 43 is then activated to disconnect gripping arm 77 from spool 16, and gripping arms 77 and 78 (FIG. 10b) are opened to move spool 16 together with gripping arm 78 through opening 11.

Arm 66 is then rotated into the second of the two maximum-swing positions (FIGS. 18c, 18d), during which rotation, cord 5 is wound about the outside of ring 8; and, as arm 66 reaches the second maximum-swing position, gripping arms 77 and 78 are rotated back into the closed position (FIG. 18e) to wind cord 5 about the second of the two beads 2. More specifically, gripping arm 78 supporting spool 16 rotates outside frame 7, and gripping arm 77 through opening 11.

Once gripping arms 77 and 78 are closed (FIG. 18f), release device 88 is again activated to pass spool 16 from gripping arm 78 to gripping arm 77, and gripping arms 77 and 78 are again rotated into the open position (FIG. 18g) to move spool 16 together with gripping arm 77 through opening 11 and so wind cord 5 about the second bead 2.

Arm 66 is then rotated in the opposite direction into the first maximum-swing position (FIG. 18h), and gripping arms 77 and 78 are again rotated, as described above, to wind cord 5 about the first bead 2 and so complete the winding cycle.

Before carcass 1 is completed, and before the gap between the last turn wound about sector 10b and the first turn wound about sector 9a gets too small to allow the passage of spool 16 through openings 11, actuating device 25 moves sector 9a from the first to the second operating position, so as to form opening 28. More specifically, sector 9a is first moved into the intermediate withdrawn position by radial actuating unit 29 (FIG. 8b), and then into the second operating position by angular actuating unit 30 (FIG. 8c).

As sector 9a is withdrawn (FIG. 8b), the turns 6 wound about sector 9a relax slightly, but this is partly compensated for (FIG. 8c) by the angular movement of sector 9a slanting the turns 6 about sector 9a with respect to their original substantially radial position with respect to axis 14.

Once sector 9a is set to the second operating position, winding device 15 completes the winding of cord 5 about sector 10b, in particular by winding the last turns 6 about plate 48. Finally, sector 9a is restored, in reverse, to the first operating position to obtain the finished carcass 1.

What is claimed is:

1. A method of producing a toroidal carcass (1) for a road vehicle tire; the carcass (1) being a woven carcass comprising two annular beads (2), and a reticulated structure (4) defined by at least one cord (5) wound about the beads (2) and connecting the beads (2) to each other; and the method comprising the steps of:

positioning said two beads (2) coaxially with and at a given distance from each other;

positioning a removable auxiliary annular element (8) radially outwards of the two beads (2) and centered axially with respect to the two beads (2), so as to define, with the two beads (2), a toroidal frame (7) having an axis (14) and two annular openings (11) coaxial with said axis (14); and feeding a spool (16), housing a given length of said cord (5), about the frame (7) by means of a winding device (15) to wind the cord (5) about the frame (7) along a spiral path (P) comprising a number of turns (6), each extending about the beads (2) and the annular element (8) and through said openings (11);

characterized in that said auxiliary annular element (8) comprises at least one movable sector (9a) along which an initial portion of said path (P) extends; the method comprising the further step, prior to winding said cord (5) completely along the whole of said path (P), of moving said movable sector (9a) from a first operating position, in which the movable sector (9a) is aligned with a remaining portion (9b) of said auxiliary annular element (8), to a second operating position, in which the movable sector (9a) at least overlaps said remaining portion (9b) of said auxiliary annular element (8) to provide an opening for the passage of said spool during the last turns of the carcass.

2. A method as claimed in claim 1, characterized in that said step of moving said movable sector (9a) from said first operating position to said second operating position comprises the steps of moving said movable sector (9a) radially from said first operating position towards said axis (14) and into an intermediate withdrawn position; and then moving said movable sector (9a) angularly about said axis (14) from said intermediate withdrawn position to said second operating positions.

3. A method as claimed in claim 2, characterized in that said movable sector (9a), when in said second operating position, overlaps a portion, located immediately downstream from the movable sector (9a) along said path (P), of said remaining portion (9b) of said auxiliary annular element (8).

4. A device for producing a toroidal carcass (1) for a road vehicle tire; the carcass (1) being a woven carcass comprising two annular beads (2), and a reticulated structure (4) defined by at least one cord (5) wound about the beads (2) and connecting the beads (2) to each other; the device comprising a removable auxiliary annular element (8) located radially outwards of the two beads (2) and centered axially with respect to the two beads (2), so as to define, with the two beads (2), a toroidal frame (7) having a first axis (14) and two annular openings (11) coaxial with said first axis (14); and a winding device (15) comprising a spool (16) housing a given length of said cord (5), and a movable unit (17) for feeding said spool (16) about said frame (7) to wind the cord (5) about the frame (7) along a spiral path (P); said spiral path (P) comprising a number of turns (6), each extending about the beads (6) and the annular element (8) and through said openings (11); characterized in that said auxiliary annular element (8) comprises at least one movable sector (9a) along which an initial portion of said path (P) extends actuating means (25) being provided to move said movable sector (9a) between a first operating position, in which the movable sector (9a) is aligned with a remaining portion (9b) of said auxiliary annular element (8), and a second operating position, in which the movable sector (9a) at least overlaps said remaining portion (9b) of said auxiliary annular element (8) to provide an opening for the passage of said spool during the last turns of the carcass.

5. A device as claimed in claim 4, characterized in that said actuating means (25) comprise radial actuating means (29) for moving said movable sector (9a) radially from said first operating position towards said first axis (14) and into an intermediate withdrawn position; and angular actuating means (30) for moving said movable sector (9a) angularly about said first axis (14) from said intermediate withdrawn position to said second operating position.

6. A device as claimed in claim 5, characterized in that said radial actuating means (29) comprise a collapsible supporting element (20a) extending substantially radially with respect to said first axis (14); said angular actuating means (30) comprising sliding means (31, 32, 33) interposed between said movable sector (9a) and said supporting element (20a) to effect said angular movement of the movable sector (9a) with respect to said supporting element (20a).

7. A device as claimed in claim 6, characterized in that said sliding means (31, 32, 33) comprise a sliding member (31) integral with said movable sector (9a); guide means (32) integral with said supporting element (20a) and connected to said sliding member (31); and actuating means (33) for moving said sliding member (31) with respect to said guide means (32) to effect said angular movement of said movable sector (9a)).

8. A device as claimed in claim 7, characterized in that said movable sector (9a) supports in fixed manner a rack (41), and in that said actuating means (33) comprise a motor (38) integral with said collapsible supporting element (20a), and a pinion (40) activated by said motor (38) and meshing with said rack (41).

9. A device as claimed in claim 4, characterized in that said movable sector (9a) is defined at opposite ends by a front surface (23a) and a rear surface (23) substantially parallel to each other; said remaining portion (9b) of said auxiliary annular element (8) being in turn defined at opposite ends by a first surface (24a) facing and parallel to said front surface (23a), and by a second surface (24) facing and parallel to said rear surface.

10. A device as claimed in claim 9, characterized in 9 that said front and rear surfaces (23a, 23) and said first and second surfaces (24a, 24) are substantially parallel to a traveling direction of said movable sector (9a) between said first operating position and said intermediate withdrawn position.

11. A device as claimed in claim 9, characterized in that said remaining portion (9b) of said annular element (8) and said movable sector (9a) have a first axial appendix (43) and, respectively, a second axial appendix (53) respectively partly defined by said first and second surfaces (24a, 24); said two appendixes (43, 53) being arranged in a face-to-face relationship and having respective sunken radial outer surfaces (44, 54); and a single plate (48), integral with said remaining portion (9b) of said annular element (8), being provided to cover said two sunken radial outer surfaces (44, 54) when said movable sector (9a) is in said first operating position.

12. A device as claimed in claim 11, characterized in that said plate (48), when viewed from above, is substantially rectangular, and has opposite edges (48a, 48b) lying in substantially radial planes with respect to said first axis (14).

13. A device as claimed in claim 4, characterized in that said movable unit (17) comprises a first oscillating element (66); first actuating means (61) for oscillating said first oscillating element (66) about a second axis (64) lying in a mid plane (20) of said frame (7) perpendicular to the first axis (14); a pair of second oscillating elements (77, 78) carried by said first oscillating element (66); and second actuating means (70, 71) for oscillating the second oscillating elements (77, 78) about a third axis (69) parallel to said second axis (64); engaging means (82) being carried by said spool (16); and releasable retaining means (81, 83) being carried by each second oscillating element (77; 78) to be engaged by said engaging means (82) to connect the spool (16) to the relative second oscillating element (77, 78).

14. A device as claimed in claim 13, characterized in that said engaging means (82) are pin means (82), and said retaining means (81, 83) are gripping means (81, 83).

15. A device as claimed in claim 13, characterized in that said second oscillating elements (77, 78) comprise a pair of curved gripping arms (77, 78) movable to and from a closed position in which the two gripping arms (77, 78) surround a section of said frame (7).

16. A device as claimed in claim 14, characterized in that said gripping means (81, 83) comprise an end recess (81) for each said gripping arm (77, 78); and in that said pin means (82) comprise a pair of extensions (82) of said spool (16), each of which engages a respective recess (81) to connect the spool (16) to the respective said gripping arm (77, 78).

17. A device as claimed in claim 16, characterized in that each said extension (82) comprises a seat (87); and in that said gripping means (81, 83) comprise, for each said gripping arm (77, 78), a retaining device (83) in turn comprising an engaging element (86) supported on said gripping arm (77, 78) and movable with respect to the gripping arm (77, 78) from a normal forward position; said forward position being a position wherein said engaging element (86) engages the respective said seat (87) when the respective said extension (82) engages the respective said recess (81).

18. A device as claimed in claim 17, characterized in that elastic means (94) are provided to maintain each said engaging element (86) in said forward position.

19. A device as claimed in claim 17, characterized in that each said retaining device (83) comprises a rocker arm element (84) pivoting on the respective said gripping arm (77, 78) and connected to the respective said engaging element (86); releasing means (88) being provided to act on said rocker arm elements (84) and move each said engaging element (86) from the respective said forward position.

20. A device as claimed in claim 19, characterized in that each said engaging element (86) is located at a first end (85) of the respective said rocker arm element (84); said releasing means (88) being cam release means cooperating with a second end (92) of each said rocker arm element (84).

21. A device as claimed in claim 20, characterized in that said releasing means (88) comprise a first shaft (89) coaxial with said third axis (69) and carried by said first oscillating element (66); an annular cam (90) carried by said first shaft (89); a pair of tappet means (91), each interposed between said first shaft (89) and said second end (92) of a respective said rocker arm element (84); and third actuating means (93)

for moving said first shaft (89) axially between a first position in which said cam (90) is connected to one of said tappet means (91), and a second position in which said cam (90) is connected to the other of said tappet means (91).

22. A device as claimed in claim 13, characterized in that said second actuating means (70, 71) comprise a pair of counter-rotating powered shafts (67, 68) coaxial with said third axis (69) and fitted for rotation to said first oscillating element (66) to oscillate with respect to the first oscillating element (66); each said shaft (67, 68) in said pair of shafts (67, 68) being fitted integrally with a respective said second oscillating element (77, 78).

23. A device as claimed in claim 13, characterized in that said spool (16) comprises a cartridge (95) for said cord (5), and a substantially cup-shaped body (96) housing said cartridge (95); said cup-shaped body (96) comprising a lateral wall (97), a bottom wall (98), and a central pin (99) extending from said bottom wall (98) and idly supporting said cartridge (95); and said cup-shaped body (96) having a pair of lateral extensions (82) for its own connection selectively to said second oscillating elements (77, 78).

24. A device as claimed in claim 23, characterized in that said cartridge (95) comprises a movable element (101) for its own fitment axially to said central pin (99).

25. A device as claimed in claim 24, characterized in that said spool (16) comprises slot means (102, 103, 104) formed in said lateral wall (97) and by which to extract the cord (5) from the spool (16); and at least one guide element (105) for guiding the cord (5), and which is fitted to said lateral wall (97) and provides for directing the cord (5) from the spool (16) in a given direction.

26. A device as claimed in claim 25, characterized in that said guide element (105) comprises a guide ring (105) located outside said lateral wall (97) and integral therewith; said guide ring (105) having an axis parallel to the axis of said spool (16).

* * * * *